March 24, 1936.  G. W. EVERITT  2,035,266
CIRCUIT CONTROLLING DEVICE FOR AN AUTOMOBILE SIGNALING MECHANISM
Filed Sept. 28, 1933  2 Sheets-Sheet 1
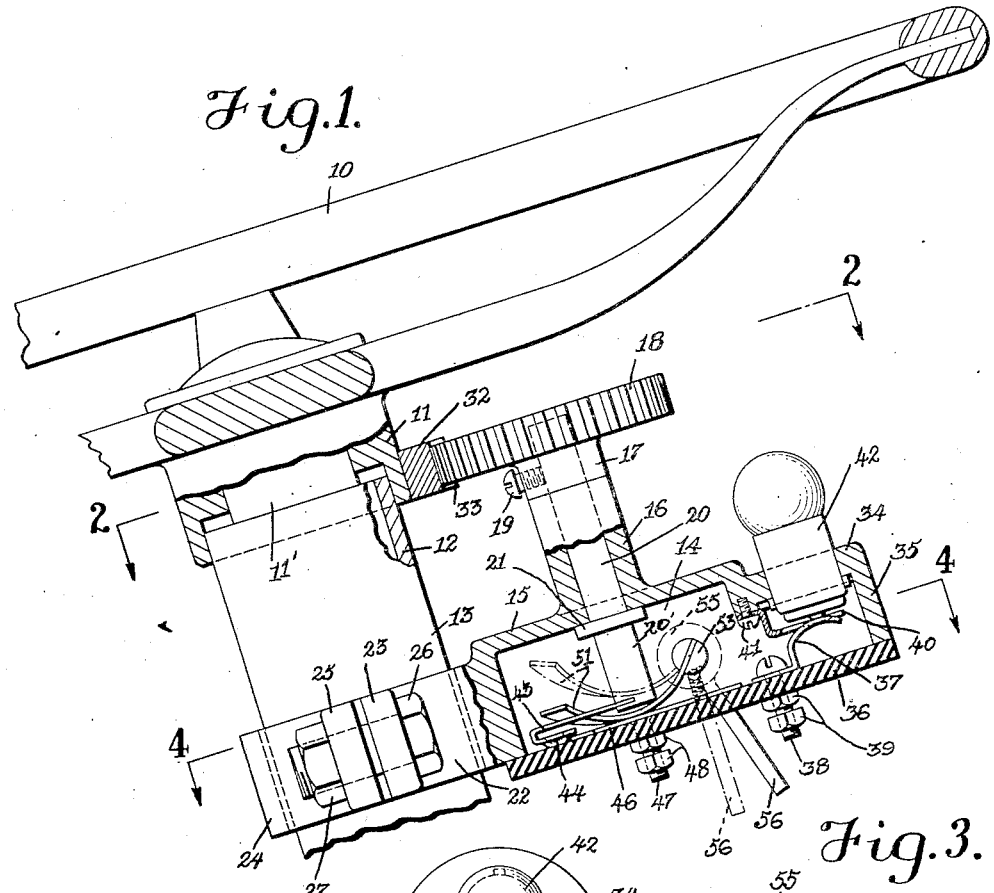
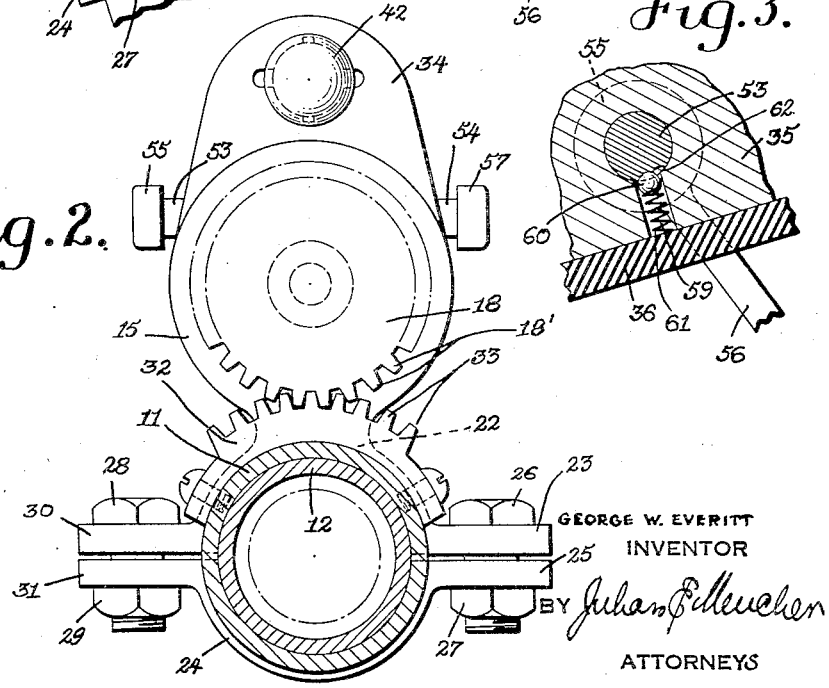
GEORGE W. EVERITT
INVENTOR
BY Julian P. Meucher
ATTORNEYS March 24, 1936. G. W. EVERITT 2,035,266
CIRCUIT CONTROLLING DEVICE FOR AN AUTOMOBILE SIGNALING MECHANISM
Filed Sept. 28, 1933 2 Sheets-Sheet 2

GEORGE W. EVERITT
INVENTOR

BY *Julius Fletcher*
ATTORNEYS

Patented Mar. 24, 1936

2,035,266

UNITED STATES PATENT OFFICE 2,035,266

CIRCUIT CONTROLLING DEVICE FOR AN AUTOMOBILE SIGNALING MECHANISM

George W. Everitt, Brooklyn, N. Y.

Application September 28, 1933, Serial No. 691,378

2 Claims. (Cl. 200—59)

This invention relates to a circuit controlling device for an automobile signaling mechanism.

An object of the invention is the construction of an efficient circuit controlling device carried by a casing that is preferably supported upon the steering wheel of a motor vehicle.

A further object of the invention is the construction of a circuit controlling device employing manually operated means mounted on a suitable casing and which is readily accessible for closing a circuit when the operator so desires.

A still further object of my invention is the construction of efficient means that is manually operated for causing an indicating signal to be operated, in an automobile signaling mechanism.

Another object of the invention is provision of structure which is economical to manufacture, easy to apply and operate and which affords ready access for purposes of repair and replacement.

These objects and other incidental ends of the invention, including particular combinations and sub-combinations of elements will hereinafter appear in the progress of this disclosure and as contained in the appended claims.

In the accompanying drawings showing a preferred embodiment of the invention, like reference characters designate corresponding parts throughout the several views.

Figure 1 is a sectional view showing a preferred form of the signaling mechanism as attached to the steering mechanism of an automobile and being partly in elevation.

Figure 2 is a plan view of Figure 1 along the line 2—2 thereof.

Figure 3 is a fragmentary and enlarged view of one of the manually operated levers as mounted in the side wall of the casing for the mechanism and as shown in relative position in Figure 1, being a section of Fig. 4 through line 3—3.

Figure 4:
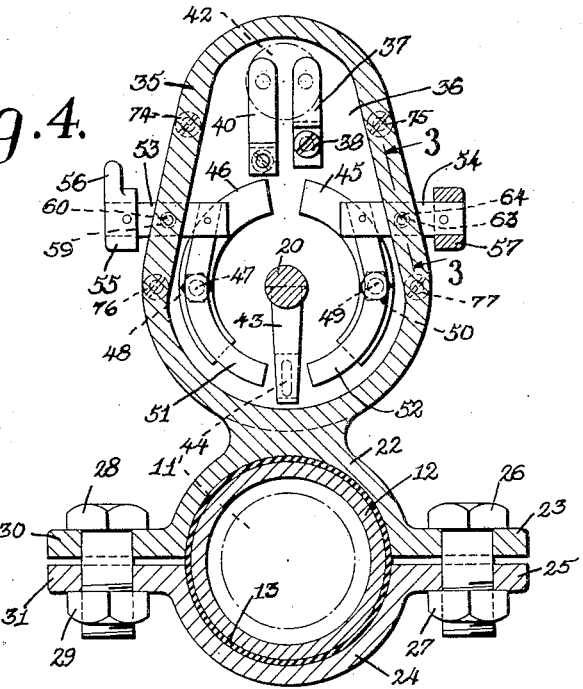
Figure 4 is a sectional view in plan along the line 4—4 of Figure 1.

From the drawings, numeral 10 represents the ordinary steering wheel, while 11 is the usual depending flange turning with the wheel and operating the revoluble post 11'. 12 represents a steering column serving as the bearing for revoluble post 11' and which affords one of the preferable means for the mounting of the signaling device.

The said steering column 12 is sufficiently insulated with lacquer to make a non-conducting contact with the clamping member 22 of the signaling device casing; or, in the alternative, an insulating bushing may be interposed therebetween, as will hereinafter more fully be described.

The structure of the signaling mechanism comprises a housing 14 open at the underside and having a non-conducting plate 36 fixed thereat and forming the closure therewith.

15 represents the upper wall of housing 14 and has projecting upwardly therefrom and preferably centrally thereof a post 16 communicating with the housing and serving as a bearing for a spindle 20. The said spindle 20 is provided with a ring 21 which limits the vertical upward movement of the said spindle while 17 is a head-piece surmounted by gear wheel 18, which said headpiece is adapted to receive the upper portion of spindle 20 and revolve therewith by means of the provision of a set screw 19. The said set screw 19 serves to limit any downwardly vertical motion of spindle 20.

34 represents the forward wall of housing 14 and is provided with a central orifice for the insertion of a pilot light 42. 35 represents the side walls of housing 14 and is provided rearwardly with a semi-cylindrical clamp member 22 having ears 23 and 30 respectively, said clamping member 22 being adapted to cooperate with a similar clamping member 24 having juxtaposed ears 25 and 31. The clamping members 22 and 24 are adapted to be affixed about the steering column 12 by means of screws 26 and 28 penetrating the sets of ears aforementioned, the said screws 26 and 28 being locked in place by nuts 27 and 29 respectively.

Spindle 20 extends into housing 14, with the portion 20' slightly shorter than the height thereof and is provided with a switch blade 43 affixed at the lower extremity of said portion 20'. The said switch blade 43 is provided with a contacting member 44 adapted to make electrical contact with contact segments 45 and 46. These contact segments 45 and 46 are concentrically arranged about the axis of spindle 20 and are mounted upon the inner surface of non-conducting plate 36. Contacting segments 45 and 46 are provided with projecting posts 49 and 47 extending from the outer surface of non-conducting plate 36 and being provided with nuts 50 and 48 for purposes of making electrical connection with the said contact segments 45 and 46.

It is to be observed that contact segments 45 and 46 are distanced from each other about the longitudinal axis of housing 14 at their terminations a predetermined amount for purposes hereinafter to be described.

37 and 40 are contact tongues for pilot light 42, tongue 37 being mounted on the inner surface of non-conducting plate 36 by means of post 38 projecting therethrough and provided with nuts 39 to serve as a binding post. Tongue 40 is mounted on the inner surface of the upper wall of the housing.

The side walls 35 of the housing 14 along the shorter axis, as best shown in Figure 4 of the accompanying drawings, are provided with apertures for the insertion of axes 53 and 54. Each of the said shafts at the portions external to the housing 14 is provided with collar members 55 and 57. Extending from the collar member 55 is a lever 56, while lever 58, although not shown on the drawings, extends from collar 57. Extending from the inner ends of shafts 53 and 54 are contact tongues 51 and 52, the said tongues being adapted to electrically connect with the contacting segments 46 and 45 when the levers of the shafts are manually pushed rearwardly, as is best shown in Figure 1 of the accompanying drawings. As in illustration, lever 56 is manually set so that tongue 51 contacts the contacting segment 46. By such manual operation of lever 56, the electrical circuit will bring about a lighting of an indicating signal or light 71. When switch blade 43 is turned to the left, contact tongue 51 is raised to its dotted position while lever 56 is also brought back to its normal position. This automatic repositioning of contact tongue 51 takes place by virtue of the fact that the upper surface of switch blade 43 during the turning operation bears against the lower surface of the said contact tongue 51, which tongue 51 is preferably concave in shape. When either of the contact tongues 51 and 52 is manually brought into electrical connection with either of the contacting segments 46 or 45, the signaling devices 70 or 71 are actuated, this actuation taking place regardless of the automatic operation of the device as will hereinafter appear. Where, however, switch blade 43 is made to revolve in either direction, the contact tongue 51 or 52 is brought to a neutral position. Shafts 53 and 54 are mounted in the apertures of the side wall 35 of housing 14 by means of bores 59 and 63 extending from the under-edge of side wall 35 and communicating with the said shafts 53 and 54. Within the said bores 59 and 63 are helical springs 61 and 65 maintaining ball-bearings 60 and 64 against the shafts 53 and 54 respectively. These ball-bearings 60 and 64 normally engage with semi-spherical excavations 62 in the shafts 53 and 54, as best illustrated in Figure 3 of the accompanying drawings. Springs 59 and 65 are maintained in tension by virtue of the non-conducting plate 36 engaging with the lower edge of the side walls 35 of the housing through the screws 74, 75, 76 and 77.

To effectuate the revolution of switch blade 43, gear teeth 18' of gear wheel 18 engage with cylindrical gear bar 32 affixed to flange 11 of steering wheel 10. Teeth 33 of said gear bar 32 engage with teeth 18' thereby causing switch blade 43 to revolve to the right whenever the steering wheel 10 is turned to the right. In order to prevent switch blade 43 from making a complete revolution with each revolution of steering wheel 10, thereby actuating the two rear signal indicators for a single directional term, my invention contemplates one of the many expedients of reducing the revolution of switch blade 43 to a practical ratio of one to three by providing gear bar 32 with one-third the number of projecting teeth relative to gear wheel 18.

The direction signal indicators 70 and 71 may be ordinary electric lights or other indicating means mounted on the rear of an automobile or in any other readily visible position.

Figure 5:
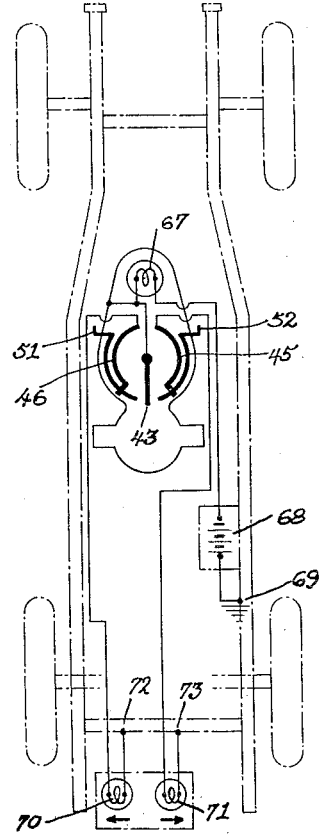
Figure 5 is a diagrammatic view of automobile showing the electrical connection of the mechanism in conjunction with rear signaling devices.

By a reference to Figure 5, it is seen how the embodiment of the invention is electrically connected. 68 represents a battery, one terminal of which is connected to the ground 69 while the other terminal 68 is in electrical connection with the pilot light 67 and continues through the pilot light 67 to switch blade 43 and contact tongues 51 and 52. The left signal indicator 70, in the form of an electric light, is connected at terminal 72 to the ground while at the other terminal, the said electric light 70 is electrically connected to contact segment 46. Similarly, signal indicator 71 at one of its terminals is connected to the ground while at the other, the indicator, in the form of an electric light, is electrically connected to contact segment 45.

It is seen from the electrical hook-up of Figure 5 that when steering wheel 10 is turned to the right, switch blade 43 contacts with contacting segment 45, thereby actuating pilot light 67 and signal indicator 71. When the steering wheel 10 is turned to the left, pilot light 67 and signal indicator 70 are lighted up. When a vehicle is taking a straight course and a turn is contemplated, assuming the turn to be a left turn, lever 56, as shown in Figure 1, is pushed forward thereby causing contact tongue 51 (which is electrically connected to switch blade 43) to contact contacting segment 46. Such manipulation will cause pilot light 67 and the left rear light 70 to light up. When the left turn is actually negotiated and the steering wheel 10 is turned, switch blade 43 turned toward the left will cause a return of lever 56 to its neutral position by pushing concave tongue member 51 upwardly.

It is of course, understood that the ratio of the revolutions of steering wheel 10 and of the switch blade 43 may be varied by the known means such as step-down gearing and the like.

I wish it understood further that as described, the upper casing for housing 14 is metallic but that any non-metallic material may be used therefor, thereby eliminating all precautions against short-circuiting of the circuit in conjunction with the steering wheel flange and column thereof.

I claim:

1. In an automobile signaling device, the combination with a steering column, a housing supported on said steering column, said housing provided on its bottom with contact segments, of shafts extending through opposite sides of said housing, each shaft provided on its outer end with a lever, each shaft provided in the housing with semi-spherical excavations, a spring-pressed ball in the housing and normally seated in an excavation, a curved contact tongue fastened within the housing to the inner end of the shaft, and said contact tongue adapted to engage one of said contact segments.

2. In an automobile signaling device, the combination with a steering column, a housing on said steering column, of a spindle extending down into said housing and having its lower end free from the bottom of the housing, a pair of contact segments on the bottom of the housing around said spindle, said spindle provided on its lower end with a switch blade adapted to engage either of said contact segments, shafts extending horizontally through the sides of said housing, each shaft provided with a lever on its outer end, each shaft provided within said housing on its inner end with a downwardly curved contact tongue, each contact tongue adapted to engage a contact segment, a brake means in said housing and engaging each shaft, a steering wheel mounted on said steering column, and said steering wheel and spindle provided with means whereby when the steering wheel is rotated, similar movement will be imparted to said spindle, substantially as shown and described.

GEORGE W. EVERITT.